United States Patent [19]

Holst et al.

[11] 3,713,803
[45] Jan. 30, 1973

| [54] | PRODUCTION OF PHOSPHATE FERTILIZERS |
|---|---|
| [75] | Inventors: Rudolf Holst, Hannover-Waldheim; Ulrich Hauschild, Hannover, both of Germany |
| [73] | Assignee: Kali-Chemie AG, Hannover, Germany |
| [22] | Filed: April 13, 1971 |
| [21] | Appl. No.: 145,077 |

Related U.S. Application Data

[63] Continuation of Ser. No. 721,920, April 17, 1960, abandoned, Continuation-in-part of Ser. No. 632,407, April 20, 1967, abandoned.

[52] U.S. Cl. ........................................... 71/45, 71/47
[51] Int. Cl. .............................................. C05b 13/00
[58] Field of Search ............ 71/42, 45, 46, 34, 47

[56] References Cited

UNITED STATES PATENTS

| 3,552,944 | 1/1971 | Hauschild et al. ........................ 71/33 |
| 1,823,849 | 9/1931 | Rothe et al. .............................. 71/46 |
| 1,194,219 | 8/1916 | Newberry et al. ..................... 71/47 X |
| 2,589,272 | 3/1952 | Miller ..................................... 71/44 X |
| 3,202,477 | 8/1965 | Loeffler et al. ........................... 23/63 |
| 1,016,989 | 2/1912 | Galt ........................................... 71/46 |

FOREIGN PATENTS OR APPLICATIONS

| 776,331 | 6/1957 | Great Britain ............................. 23/63 |
| 467,075 | 6/1937 | Great Britain ............................. 23/63 |

*Primary Examiner*—Reuben Friedman
*Assistant Examiner*—Richard Barnes
*Attorney*—Christen & Sabol

[57] ABSTRACT

A phosphate fertilizer is prepared from a mixture of phosphate rock, silica, and an alkali metal hydroxide solution. The alkali metal hydroxide solution is concentrated and at least partially carbonated by carbon dioxide containing gases, before it is incorporated in the mixture. The granulated mixture is then calcined in a rotary kiln, and the hot waste gases of the kiln are used for the preceding concentrating and carbonating step.

8 Claims, No Drawings

PRODUCTION OF PHOSPHATE FERTILIZERS

This application is a continuation of Ser. no. 721,920, filed Apr. 17, 1968, now abandoned which is a continuation-in-part of our application Ser. No. 632,407, filed Apr. 20, 1967 now abandoned.

This invention relates to the production of phosphate fertilizers by calcination of natural calcium phosphates.

It is known that such natural calcium phosphates which consist essentially of fluoroapatite, can be converted by a calcination process to efficient phosphate fertilizers. For the decomposition, soda ash, and silica in amounts depending on the gangue present, have been used, see, e.g., U.S. Pat. No. 1,799,882. The calcining temperatures at which the reaction mixtures are strongly sintered, are usually between 1,100° and 1300°C. In the calcination process, the calcium phosphates, also called raw phosphates, are converted to a calcium-sodium-silicophosphate. In these products, the phosphoric acid component is available in a form which is readily assimilated by plants.

Phosphate fertilizers are evaluated on the basis of the $P_2O_5$ solubility in a 2 percent citric acid solution, or in ammoniacal ammonium citrate solution, which latter is also known as Petermann solution. The final products contain between 27 and 30 percent by weight of $P_2O_5$. For the production of mixed potassium containing fertilizers, potassium salts like potassium chloride are usually admixed to the calcined phosphates.

It has been also proposed to use potassium carbonate instead of sodium carbonate for the calcination. So far, however, no commercial process for the production of a potassium-calciumsilicophosphate could be developed. This is due not only to economic reasons but also to technical and chemical difficulties. For instance, a process disclosed in French Pat. No. 1,189,773 where the calcium phosphate is decomposed by potassium carbonate at the relatively low temperatures of 550° to 900°C, requires very long reaction times and has the further drawback of using large amounts of alkali. Such excess of alkali causes difficulties in the use of the product.

In addition to alkali metal carbonates, also the use of alkali metal hydroxides has been proposed. However, no commercial phosphate rock decomposition process with alkali metal hydroxides has been known. Our own investigations have shown that very great difficulties are experienced when attempts are made to decompose phosphate rock with alkali metal hydroxides in a calcining kiln. Some of these difficulties are due to the volatility of the alkali metal hydroxides particularly potassium hydroxide, at elevated temperatures, and their high alkalinity. There are considerable losses of alkali and strong corrosion of the furnace material. During processing, the reaction mixture conglomerates and forms rings which render a proper operation of the kiln impossible. The conditions become still more difficult when aqueous alkali metal hydroxide solutions are used for the calcination. Starting materials comprising alkali metal hydroxide solutions as they are obtained, for instance, in the alkali metal chloride electrolysis, phosphate rock and sand are in a liquid to muddy or at best pasty state. When such mixtures are directly introduced in a rotary kiln, they stick to the walls like a concrete layer which grows until it clogs completely the kiln.

It is a principal object of the invention to provide a process for the calcination of phosphate rock with aqueous alkali metal hydroxide solutions and silica which avoids the difficulties recited above.

Other objects and advantages will be apparent from a consideration of the specification and claims.

As phosphate rock, any natural calcium phosphate such as Florida pebble phosphate, Curacao phosphate, and others can be used.

Suitable alkali metal hydroxides are sodium hydroxide, potassium hydroxide, and mixtures thereof.

According to the invention, the aqueous alkali metal hydroxide solution is treated with hot carbon dioxide containing gases, for instance waste gases of the calcination process, which have a temperature of about 400° to 600°C. This treatment results in a concentration of the alkali metal hydroxide solution and in at least partial conversion of the alkali metal hydroxide to the carbonate. This result can be produced in various ways.

In a first embodiment of the invention, the aqueous alkali metal hydroxide solution is treated with the calcination kiln waste gases prior to its admixture to the phosphate rock and silica. In this embodiment, the treatment with the hot carbon dioxide containing waste gases is continued until the solution has reached a concentration of 65 to 75 percent by weight of the alkali metal carbonate. At such concentrations, the saturation limit of the hot solutions is normally exceeded and part of the alkali metal carbonate precipitates in form of small crystallites; in this case, the end product is a suspension.

The concentration of the starting alkali metal hydroxide solution is not critical. When the alkali metal hydroxide concentration is between 30 and 60, preferably between 45 and 55 percent by weight, the desired alkali metal carbonate end concentration of 65 to 75 is generally obtained without additional heat supply. Aqueous alkali metal hydroxide solutions, as are obtained in the alkali metal chloride electrolysis, can be directly used.

The described treatment of the aqueous alkali metal hydroxide solutions has the further advantage of absorbing the escaped alkali metal compounds of the following calcination step, and generally the dust particles of the waste gases; this effect may be sufficient to obviate the need for a purification of the waste gases.

The obtained still hot high concentrated aqueous alkali metal carbonate solutions are, without being cooled, intimately mixed with the phosphate rock and the required amount of silica (sand), whereby granulation takes place. The granulation ensures a uniform heating of the charge in the kiln. The granulation property of the mixture depends on the concentration of the aqueous alkali metal carbonate suspension. If the concentration of the alkali metal carbonate solution or suspension is too low, only a pasty mixture is obtained which forms in the kiln large lumps which may interfere with the proper kiln operation and with the complete decomposition of the phosphate. As stated hereinabove, good granulates are obtained when alkali metal carbonate suspensions are used which contain about 65 to 75 percent by weight of the carbonate. A small proportion of alkali metal hydroxide in the aqueous alkali metal carbonate suspension is not harmful for the subsequent kiln operation. This modification is of particular advantage when potassium hydroxide is employed.

When the waste gases of the calcination have a rather low carbon dioxide content, e.g., below 15 percent by volume, another embodiment of our process is of advantage where the aqueous alkali hydroxide solution is not completely converted to alkali metal carbonate before its mixture with phosphate rock and silica.

In this modification, aqueous solutions which contain 30 to 60, preferably 45 to 55 percent by weight of alkali metal hydroxide are treated with the hot carbon dioxide containing waste gases of the calcination kiln until a slurry is obtained which contains 5 to 50 percent by weight of alkali metal carbonate and 95 to 50 percent by weight of alkali metal hydroxide, whereby the total alkali content is between 60 and 70 percent by weight, calculated as alkali metal hydroxide. This slurry is then mixed with phosphate rock and the required amount of silica and granulated in a current of kiln waste gases, thereby further concentrating the slurry and increasing its content of alkali metal carbonates.

The concentration and carbonation of the aqueous alkali hydroxide solutions can be carried out by spraying the solution into the waste gases which have a temperature of about 100° to 600°C and a carbon dioxide content of about 5 to 25 percent by volume. The thus produced slurry may then be passed, together with the calcination waste gases, directly into a suitable mixing apparatus, e.g., a paddle screw, drying or mixing drum, where it is processed, in presence of said waste gases, with phosphate rock and the required amount of silica to a friable or granulated mass.

The treatment of the aqueous alkali metal hydroxide solution and the mixture of the reaction components can be carried out, of course, in any other manner. For instance, the calcination waste gases may be passed first through the mixing apparatus and then into the spray device, or separate waste gas currents may be used for the spraying and mixing operations. In each case, however, the operation should be continuous. Both operations, spraying the aqueous alkali hydroxide solution into the waste gases and mixing the same with phosphate rock and silica in presence of said waste gases may be accomplished in a suitable single apparatus.

A calcined phosphate useful as fertilizer must contain the components in certain mole proportions; 1.2 to 1.5 moles of $Me_2O$ (alkali metal oxide) must be added per 1 mole of $P_2O_5$. The molar ratio of $P_2O_5 : SiO_2$ in the mixture must be in the range between 1 : 0.1 and 1 : 0.9, preferably between 1 : 0.6 and 1 : 0.8. The $SiO_2$ amount in the mixture must be so adjusted that it binds the amount of CaO, which exceeds the molar ratio of 2 CaO : 1 $P_2O_5$, in form of $Ca_2SiO_4$. When the silica content of the raw phosphate does not satisfy said molar ratio, the required amount of $SiO_2$ is added as sand.

The calcination is carried out continuously in a rotary kiln which must be long enough to provide for a pre-heating zone and the calcination zone proper and in which the charge fed at one end is heated by the flame and combustion gases of a burner arranged at the discharge end and burning gas, coal dust or preferably oil. The flame gases heat the reaction mixture in the calcining zone to a maximum temperature in the range of 1,000° to 1,300°, preferably 1,050° to 1,200°C and are then passed in counter-current to the charge which is preheated in a preheating zone of the kiln, and are used for the carbonation and granulation of the starting mixture as described hereinabove.

If potassium hydroxide has been used to prepare the mixture to be calcined, the calcination temperature is adjusted at 1,050° to 1,150° C; the preferred maximum temperature in this case is 1,130°C. If sodium hydroxide has been used, the preferred temperature range is 1,100° to 1200°C. The total residence time of the charge in the kiln is about 1 to 1.5 hours, and the calcination proper requires about 15 minutes. The calcined product is then cooled and, if desired, ground.

The calcined phosphates thus obtained are valuable fertilizers. The potash phosphate-products have the very high total plant nutrient content of 50 percent of $P_2O_5$ and $K_2O$. As, in addition, the calcium is present in basic form, the fertilizers are particularly effective for lime-deficient soils. The $P_2O_5$ is substantially completely available.

The alkali is only to a more or less small extent soluble in water. The properties of the compound potash-phosphate fertilizers prepared according to the invention are particularly favorable. The water-soluble $K_2O$ portion amounts to about 15 to 20 percent of the total $K_2O$. Only with the uptake of $P_2O_5$ by the soil or the plants, the residual $K_2O$ is slowly dissolved; this results in an extended fertilizer effect of the potash, in contrast to the conventional potash fertilizers. The product of the invention is readily ground and can be transformed with little water to hard wear-resistant grains. By addition of potassium salts during granulation the $K_2O$ content of the calcined phosphate fertilizer can be increased, as desired.

The following examples are given to illustrate but not to limit the invention. All percentages are by weight, unless indicated otherwise.

EXAMPLE 1

83.2 kg of an aqueous suspension containing 50 percent by weight of potassium hydroxide were treated with the waste gases of a calcination process which was carried out simultaneously and in which a mixture of raw phosphate, potassium carbonate, and silica was calcined. This treatment was continued until an aqueous suspension had been obtained which contained 69.9 percent by weight of $K_2CO_3$. Only a small proportion (6.2 percent) of the potassium was still in the form of potassium hydroxide. The hot suspension which contained also the dust particles of the waste gases, was then thoroughly mixed with 100.00 kg of a North African phosphate rock, which contained 37.6% $P_2O_5$, 50.8% CaO, 3.8% F, and 2.1% Si, and 8 kg of sand (98 % $SiO_2$). A finely divided granulate was obtained and charged into the rotary kiln whose exhaust gases had been used for carbonating and concentrating the potassium hydroxide. In the rotary kiln, the material was heated at a maximum temperature of 1,130°C. The total residence time in the kiln was 30 minutes, the residence time in the calcination zone about 15 minutes. The lightly sintered product was easily ground and contained 26.4% of $P_2O_5$ and 23.6% of $K_2O$. The $P_2O_5$ was 100 percent soluble in 2 percent citric acid solution.

The solubility in ammonium citrate solution was 96 percent and in Petermann solution 98 percent. 18 percent of the $K_2O$ dissolved in water.

EXAMPLE 2

A mixture which contained 80 kg of sand for 1,000 kg of a North African raw phosphate (37.2% $P_2O_5$; 50.7% CaO) was metered continuously into a paddle screw. At the same time, the paddle screw received a hot slurry obtained in a spray tube by introducing, for 1,000 kg of the raw phosphate, 800 kg of a 50 percent potassium hydroxide solution with the hot waste gases of the phosphate calcination kiln which previously had been passed through the paddle screw. The slurry itself had a total alkali content of 60 percent, calculated as MeOH, 30 percent were present in the form of potassium carbonate. During the mixing operation, the calcination waste gases were passed through the paddle screw; thereby, further concentrating the slurry and increasing its content of potassium carbonate, a friable or granulated product was formed.

Said product was immediately introduced into a heated rotary kiln where it was calcined at a maximum temperature of 1,130°C. The cooled and ground calcination product contained 26.8 percent of $P_2O_5$ and 24.1 percent of $K_2O$. The solubility of the $P_2O_5$ was 99.8 percent in citric acid solution and 98.6 percent in Petermann solution.

EXAMPLE 3

A mixture which contained 80 kg of sand for 1,000 kg of a North African raw phosphate (37.3% $P_2O_5$; 50.6% CaO) was continuously introduced into a directly heated mixing drum together with part of the waste gases of the phosphate calcination kiln. Simultaneously, there was introduced into the drum a hot slurry obtained by spraying, per 1,000 kg of the raw phosphate, 590 kg of a 50 percent sodium hydroxide solution with another part of said waste gases. Said slurry contained a total amount of alkali, calculated as MeOH, of 65 percent and a sodium carbonate content of about 20 percent. The obtained friable and granulated mass was continuously and directly passed into a rotary kiln lined with basic refractories and calcined therein at a maximum temperature of 1,130° to 1,160°C. The cooled and ground calcination product contained 28.9 percent of $P_2O_5$ and 17.4 percent of $Na_2O$. The solubility of the $P_2O_5$ in citric acid solution was 99.2 percent and in Petermann solution 98.2 percent.

Like in all the other examples, the hot waste gases leaving the calcination kiln were the gases partly introduced in the mixing drum and partly used for spraying and carbonating the sodium hydroxide slurry.

EXAMPLE 4

As in Example 2, a mixture was continuously metered into a paddle screw which contained 100 kg of $SiO_2$ per 1,000 kg of a Kola apetite concentrate (39.1% $P_2O_5$). Simultaneously, there was introduced continuously per 1,000 kg of the raw phosphate a hot slurry obtained by spraying directly into the hot waste gases of the calcination kiln a mixture of 296 kg of a 50 percent sodium hydroxide solution and 415 kg of a 50 percent potassium hydroxide solution. Said waste gases were passed successively through the spray tube and the paddle screw.

The total alkali content of the slurry was 65 percent, calculated as MeOH, whereby about 20 to 25 percent thereof was present in form of alkali metal carbonate.

During the mixing operation, the entire waste gases from the calcination process were passed through the mixing screw, producing a friable to granulated mass. Said mass was directly passed into a basically lined rotary kiln and calcined therein to a maximum temperature between 1,120° and 1,140°C. The cooled and ground end product contained 28.4 percent of $P_2O_5$, 12.6 percent of $K_2O$ and 8.3 percent of $Na_2O$. The $P_2O_5$ had a solubility of 99.4 percent in citric acid solution and 98.4 percent in Petermann solution.

What is claimed is:

1. A process for the continuous production of a citrate soluble phosphate fertilizer by calcination of a mixture of phosphate rock, silica, and an alkali metal compound in a flame heated rotary kiln at a temperature of 1,000° to 1,300°C, the mole ratio of the alkali metal oxide $Me_2O$ to the $P_2O_5$ of the phosphate rock being 1.2 : 1 to 1.5 : 1, the mole ratio of $P_2O_5$ : $SiO_2$ being 1 : 0.1 to 1 : 0.9 and the amount of $SiO_2$ in the mixture being adjusted to bind the amount of CaO which exceeds the mole ratio of 2 CaO : 1 $P_2O_5$ in the form of $Ca_2SiO_4$, including in a first stage outside of the rotary kiln treating an alkali metal hydroxide solution having a content of 30 to 60 percent by weight of alkali metal hydroxide with the hot waste gases of the rotary kiln containing carbon dioxide together with the expelled alkali metal compounds and dust particles from the previous calcination stage, concentrating and carbonating the alkali hydroxide solution which contains said alkali metal compounds and dust particles to form a granulate with the phosphate rock and the silica which can be heated without melting to the calcination temperature, and calcining said granulate in a second stage in said rotary kiln and employing the waste gases therefrom for the treatment of further alkali metal hydroxide solution in the first stage.

2. The continuous process as claimed in claim 1 comprising converting the alkali metal hydroxide solution in said first stage outside the kiln to an aqueous suspension containing 65 to 75 percent by weight of alkali metal carbonate with said hot waste gases of the rotary kiln containing carbon dioxide together with the expelled alkali metal compounds and dust particles, and mixing and granulating said suspension with said phosphate rock and silica.

3. The continuous process as claimed in claim 1 comprising treating in said first stage outside the kiln the aqueous alkali metal hydroxide solution containing 30 to 60 percent by weight of alkali metal hydroxide with said hot waste gases of the rotary kiln containing carbon dioxide together with the expelled alkali metal compounds and dust particles until a slurry is formed which contains 5 to 50 percent by weight of alkali metal carbonate and 95 to 50 percent by weight of alkali metal hydroxide and a total alkali content of about 60 to 70 percent by weight, calculated as alkali metal hydroxide, and granulating said slurry with said phosphate rock and silica in the presence of said hot waste gases, thereby further concentrating the slurry and increasing its content of alkali metal carbonates.

4. The continuous process as claimed in claim 1 wherein said aqueous alkali metal hydroxide solution contains a member of the group consisting of sodium hydroxide, potassium hydroxide, and mixtures thereof.

5. The continuous process as claimed in claim 1 wherein the alkali metal hydroxide is sodium hydroxide and the maximum temperature in the calcination step is 1,100° to 1,200°C.

6. The continuous process as claimed in claim 1 wherein the alkali metal hydroxide is potassium hydroxide and the maximum temperature in the calcination step is 1,050° to 1,150°C.

7. The continuous process as claimed in claim 1 comprising the step of comminuting the calcined product and granulating the same with a member of the group consisting of water and aqueous potassium salt solutions.

8. The continuous process as claimed in claim 1 wherein said aqueous solution contains 45 to 55 percent by weight of alkali metal hydroxide.

* * * * *

UNITED STATES PATENT OFFICE
CERTIFICATE OF CORRECTION

Patent No. 3,713,803          Dated January 30, 1973

Inventor(s) Rudolph Holst et al.

It is certified that error appears in the above-identified patent and that said Letters Patent are hereby corrected as shown below:

On the Title page:

In line (63) "April 17, 1960" should read -- April 17, 1968 --.

Insert the following:

(30) Foreign Application Priority Data:

-- Germany          K 62 033 IVa/16    April 17, 1967 --.

Signed and Sealed this

Thirtieth Day of May 1978

[SEAL]

Attest:

RUTH C. MASON          LUTRELLE F. PARKER
Attesting Officer      Acting Commissioner of Patents and Trademarks